United States Patent
Xiao et al.

(10) Patent No.: US 9,632,611 B1
(45) Date of Patent: Apr. 25, 2017

(54) GOA CIRCUIT FOR IN-CELL TYPE TOUCH DISPLAY PANEL

(71) Applicant: Wuhan China Star Optoelectronics Technology Co., Ltd., Wuhan (CN)

(72) Inventors: Juncheng Xiao, Wuhan (CN); Shangcao Cao, Wuhan (CN); Yao Yan, Wuhan (CN); Ronglei Dai, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 15/009,803

(22) Filed: Jan. 28, 2016

(30) Foreign Application Priority Data

Oct. 10, 2015 (CN) .......................... 2015 1 0654047

(51) Int. Cl.
*G09G 3/36* (2006.01)
*G06F 3/041* (2006.01)

(52) U.S. Cl.
CPC .. *G06F 3/0412* (2013.01); *G06F 2203/04103* (2013.01)

(58) Field of Classification Search
CPC .............................................. G09G 2310/0286
USPC ............................................ 345/100, 173–174
See application file for complete search history.

(56) References Cited

U.S. PATENT DOCUMENTS

| | | | |
|---|---|---|---|
| 8,982,032 B2* | 3/2015 | Lee .................. | G06F 3/041 345/100 |
| 2016/0049126 A1* | 2/2016 | Zhang ................ | G09G 3/3648 345/173 |
| 2016/0246418 A1* | 8/2016 | Wang .................. | G11C 19/28 |

\* cited by examiner

*Primary Examiner* — Roy Rabindranath
(74) *Attorney, Agent, or Firm* — Leong C. Lei

(57) ABSTRACT

The invention discloses a GOA circuit for in-cell type touch display panel; during black screen, using a first global control signal to make a thirteenth N-type TFT conductive to raise a scan driving signal of each stage to high, using the first global control signal to make a twelfth N-type TFT conductive to pull down a voltage level of a second node, and pulling down a voltage level of a first node to avoid ineffective all-gate-on function; using a reset signal and a fourteenth N-type TFT to reset the second node to realize the normal output after awaking from black screen; during stop, setting a negative voltage as a pulse signal having same amplitude, phase and frequency as a touch signal, using a second global control signal to make the fifteenth N-type TFT conductive to output the negative voltage in pulse form to reduce cross-talk between the touch signal and a scan output end.

8 Claims, 5 Drawing Sheets

GOA CIRCUIT FOR IN-CELL TYPE TOUCH DISPLAY PANEL

BACKGROUND OF THE INVENTION

1. Field of the Invention

The present invention relates to the field of liquid crystal display (LCD), and in particular to a gate driver on array (GOA) circuit for in-cell type touch display panel.

2. The Related Arts

The gate driver on array (GOA) technology is the array substrate column drive technology, by using the thin film transistor (TFT) liquid crystal display (LCD) array processor to manufacture the gate scan driver circuit on the TFT array substrate to realize the column-by-column scan driving. The GOA technology has the advantages of low manufacture cost and the ability to realize narrow-border panels, and is used by many types of displays. GOA circuit has two basic functions: first, to output scan driving signal to drive the gate line in the panel to turn on the TFT in the display area so as to charge the pixels; and the second is the shift bit saving; when the N-th scan driving signal is outputted, the clock control is used to perform outputting the (N+1)-th scan driving signal, and so on.

The embedded touch technology is to integrate the touch panel with the liquid crystal (LC) panel, and embed the function of the touch panel to the LC panel so that the LC panel can both display and sense the touch to input. As the display technology rapidly grows, the touch panel is widely accepted and used, such as, smart phone, tablet, and so on.

The current embedded technology can be categorized in two types. The first type is the on-cell type and the other is in-cell type. The driving manner of the in-cell type touch panel is time-division driving, i.e., the display driving and the touch signal driving are separately transmitted.

The in-cell type touch panel usually needs GOA circuit to have the all-gate-on function of raising all the scan driving signals for each stage to a high level during the black screen duration to clear the residual voltage in each pixel. However, the all-gate-on function may not stay in effecting in the current single-type GOA circuit.

The in-cell type touch panel also needs the GOA circuit to have the signal stop (interrupt) function; that is, when the GOA circuit operates normally, the ability to simultaneously turn off the scan driving signals of all GOA stages; then, the panel executes the touch detection. After the interruption, the GOA circuit must return to normal driving function. The risk of electricity leakage exists in the current single-type GOA circuit when performing signal stop.

SUMMARY OF THE INVENTION

The object of the present invention is to provide a GOA circuit for in-cell type touch display panel, not only to realize the all-gate-on and sign stop functions, but also improve the circuit stability, and reduce the cross-talk between the touch signal and the scan driving signal during stop duration.

To achieve the above object, the present invention provides a GOA circuit for in-cell type touch display panel, which comprises: a plurality of cascade GOA units, N being a positive integer, the N-th stage GOA unit further comprising: a forward and backward scan control module, a first node pull-down control module, a second node control module, a second node reset module, a stop-duration output control module, a black-screen-duration output control module, and a normal-display-duration output control module; the black-screen-duration output control module further comprising: a thirteenth N-type thin film transistor (TFT); a gate and a source of the thirteenth N-type TFT both connected to a first global control signal, and a drain being connected to a scan output end; the first global control signal providing a constant positive voltage during black screen duration to make the thirteenth N-type TFT of GOA unit of each stage conductive so that the scan driving signals of each stage being raised to a high level voltage; the second node control module further comprising a twelfth N-type TFT; a gate of the twelfth N-type TFT being connected to the first global control signal, a source connected to a negative voltage and a drain connected to the second node; during black screen duration, the twelfth N-type TFT of GOA unit of each stage being controlled by the first global control signal to become conductive, and the negative voltage providing a constant negative voltage during the black screen duration to pull down the voltage of the second node; the second node reset module further comprising: a fourteenth N-type TFT; a gate and the source of the fourteenth N-type TFT being connected to a reset signal, a drain being connected to the second node; the reset signal providing a single positive voltage pulse signal when awakening from the black screen duration to make the fourteenth N-type TFT of GOA unit of each stage conductive so that the second node of GOA unit of each stage being reset to high voltage level; the stop-duration output control module further comprising a fifteenth N-type TFT, a gate of the fifteen N-type TFT connected to a second global control signal, a source connected to a negative voltage, and a drain being connected to the scan output end; the second global control signal providing a constant positive voltage during the stop duration to make the fifteenth N-type TFT of GOA unit of each stage conductive; the negative voltage providing a pulse signal the same as a touch signal in amplitude, phase and frequency during the stop duration so as to reduce the cross-talk between the touch signal and the scan output end.

The forward and backward scan control module comprises: a first N-type TFT, a gate of the first N-type TFT being connected to the scan output end of the GOA unit of an (N−2)-th stage, a source connected to a forward scan signal, and a drain connected to the first node; a second N-type TFT, a gate of the second N-type TFT being connected to the scan output end of the GOA unit of an (N+2)-th stage, a source being connected to a backward scan signal, and a drain connected to the first node; the first node pull-down control module further comprising: a fifth N-type TFT, a gate of fifth N-type TFT connected to the second node, a source connected to a negative voltage and a drain connected to the first node; and a eleventh N-type TFT, a gate of the eleventh N-type TFT connected to the scan output end of the GOA unit of the (N−2)-th stage, a source connected to the negative voltage and a drain connected to the second node; the second node control module further comprising: a third N-type TFT, a gate of the third N-type TFT connected to the forward scan signal, a source connected to an (m−1)-th clock signal set corresponding to the GOA unit of an (N−1)-th stage; a fourth N-type TFT, a gate of the fourth N-type TFT connected to the backward scan signal, a source connected to an (m+1)-th clock signal set corresponding to the GOA unit of the (N+1)-th stage, and a drain connected to the drain of the third N-type TFT; a sixth N-type TFT, a gate of the sixth N-type TFT connected to the first node, a source connected to a negative voltage, and a drain connected to the second node; a seventh N-type TFT, the gate of the seventh N-type TFT connected to a positive voltage, the source and the drain connected to the first node;

and an eighth N-type TFT, a gate of the eighth N-type TFT connected to the drain of the third N-type FTF and the drain fourth N-type TFT, a source connected to a positive voltage, and a drain connected to the second node; the normal-display-duration control module further comprising: a ninth N-type TFT, a gate of the ninth N-type TFT connected to the second node, a source connected to a negative voltage, and a drain connected to the scan output end; and a tenth N-type TFT, a gate of the tenth N-type TFT connected to the first node, a source connected to an m-th clock signal set, and a drain connected to the scan output end.

The GOA circuit for in-cell type touch display panel further comprises: a first capacitor, the first capacitor having one end connected to a negative voltage and the other end connected to the second node; and a second capacitor, the second capacitor having one end connected to the gate of the tenth N-type TFT and the other end connected to the drain of the tenth N-type TFT.

In the GOA unit of the first stage and the GOA unit of the second stage, the gates of the first N-type TFT and the eleventh N-type TFT are connected to a circuit activation signal; in the GOA units of the last stage and the second last stage, the gate of the second N-type TFTs is connected to the circuit activation signal.

During the black screen duration, the scan activation signal, the positive voltage and the first global control signal are all set to 5V; the reset signal, each clock signal set, the forward and backward scan signals, the negative voltage, and the second global control signal are all set to −5V.

During the normal display duration, the scan activation signal has a high level set as 10V and a low level set as −7V; the reset signal has a high level set as 10V and a low level set as −7V; the positive voltage is 10V; the negative voltage is −7V; the first global control signal and the second global control signal are both set as −7V; each clock signal set has a high level set as 10V and a low level set as −7V, and each clock signal set is delayed by a pulse width sequentially.

During forward scanning duration, the forward scan signal is 10V and the backward scan signal is −7V; during the backward scanning duration, the forward scan signal is −7V and the backward scan signal is 10V.

During the stop duration, the scan activation signal is −11.5V; the reset signal is −7V; the positive voltage is 10V; each clock signal set has the same amplitude, phase and frequency and acts as touch signals, having a high level set to −7V and a low level set to −11.5V; the negative voltage is a pulse signal having the same amplitude, phase and frequency as each clock signal set, with a high level set to −7V and a low level set to −11.5V; the first global control signal is −11.5V and the second global control signal is 10V.

The clock signal comprises four sets of clock signals: the first clock signal set, the second clock signal set, the third clock signal set and the fourth clock signal set; when the m-th clock signal set is the fourth clock signal set, the (m+1)-th clock signal set is the first clock signal set; when the m-th clock signal set is the first clock signal set, the (m−1)-th clock signal set is the fourth clock signal set.

Compared to the known techniques, the present invention provides the following advantages: the present invention provides a GOA circuit for in-cell type touch display panel; during the black screen duration, using the first global control signal to make the thirteenth N-type TFT conductive so that the scan driving signal of each stage is raised to the high level, using the first global control signal to make the twelfth N-type TFT conductive to pull down the voltage level of the second node to prevent the negative voltage from outputting to the scan driving signal and by making the first N-type TFT and the second N-type TFT conductive to pull down the voltage level of the first node to prevent the clock signal from outputting to the scan driving signal to avoid ineffective all-gate-on function; using reset signal and the fourteenth N-type TFT to reset the second node of GOA unit of each stage to realize the normal output after awaking from the black screen duration; during the stop duration, the negative voltage is set as a pulse signal having the same amplitude, phase and frequency as the touch signal, the second global control signal is used to make the fifteenth N-type TFT of GOA unit of each stage conductive and output the negative voltage in a pulse form so as to reduce the cross-talk between the touch signal and the scan output end.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
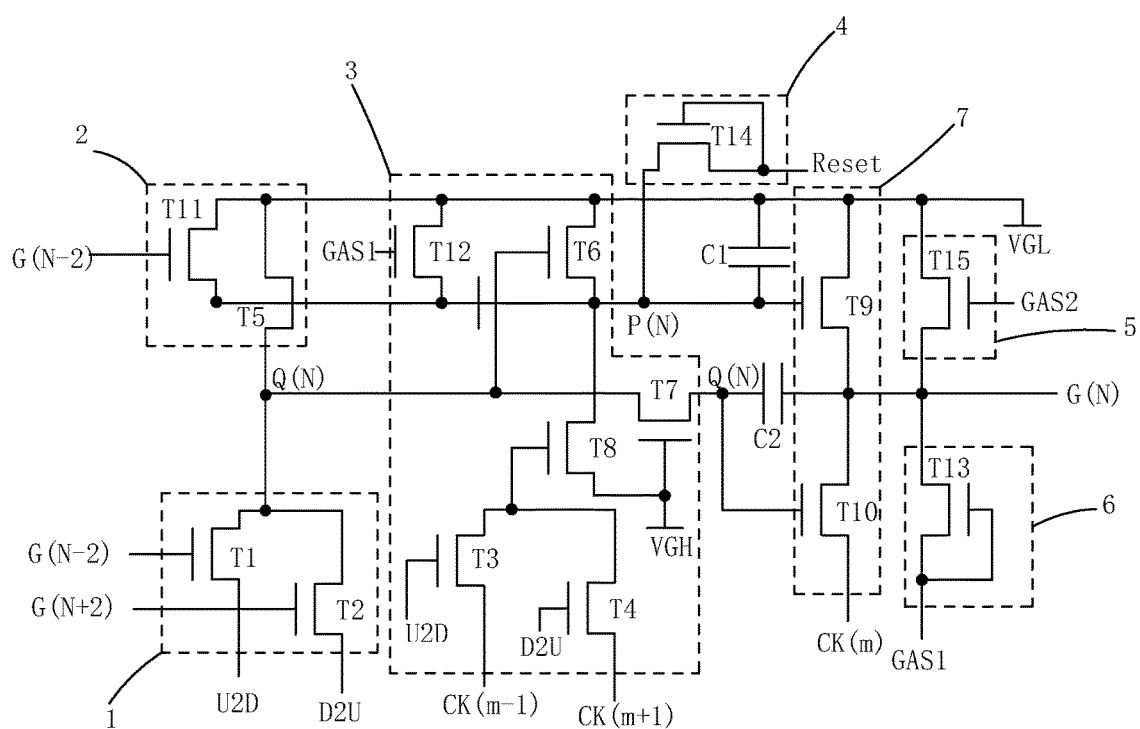
FIG. 1 is a schematic view showing the GOA circuit for in-cell type touch display panel provided by an embodiment of the present invention.
Figure 6:
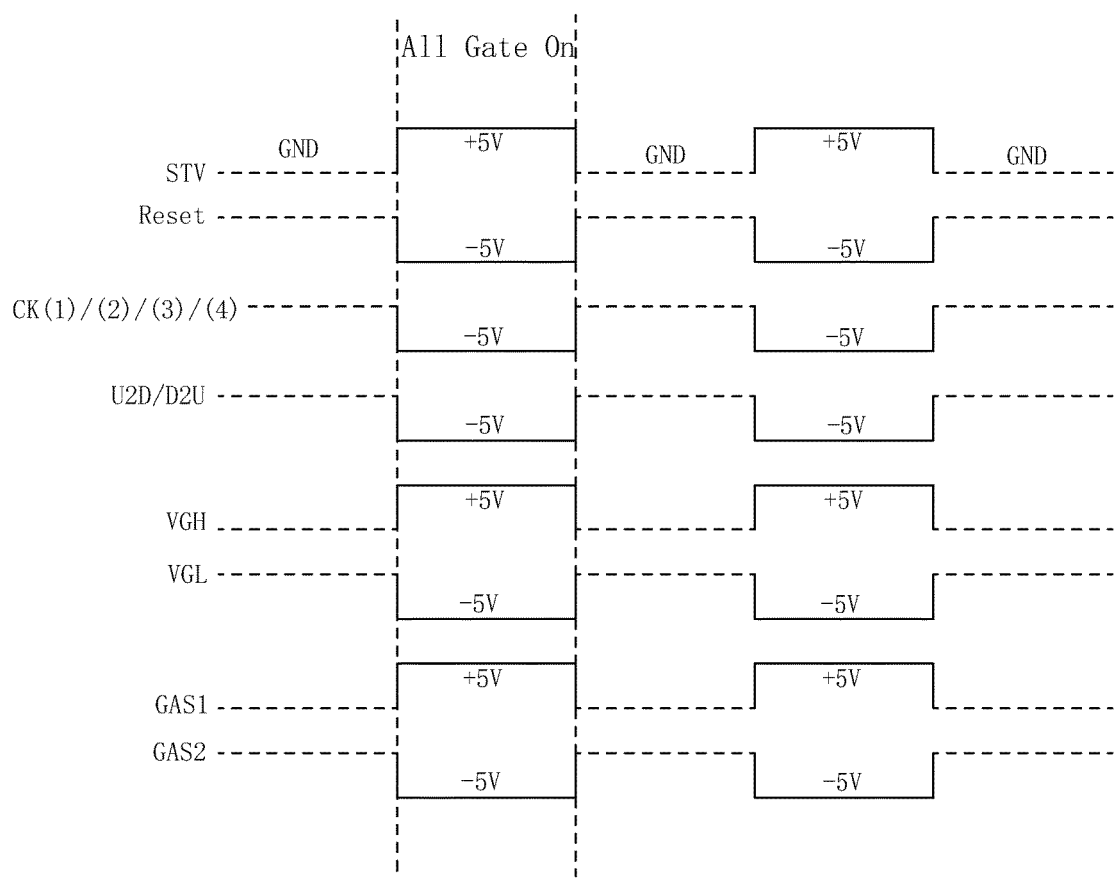
FIG. 6 is a schematic view showing the operation timing of the GOA circuit for the touch display panel during the black screen duration provided by an embodiment of the present invention.
Figure 7:
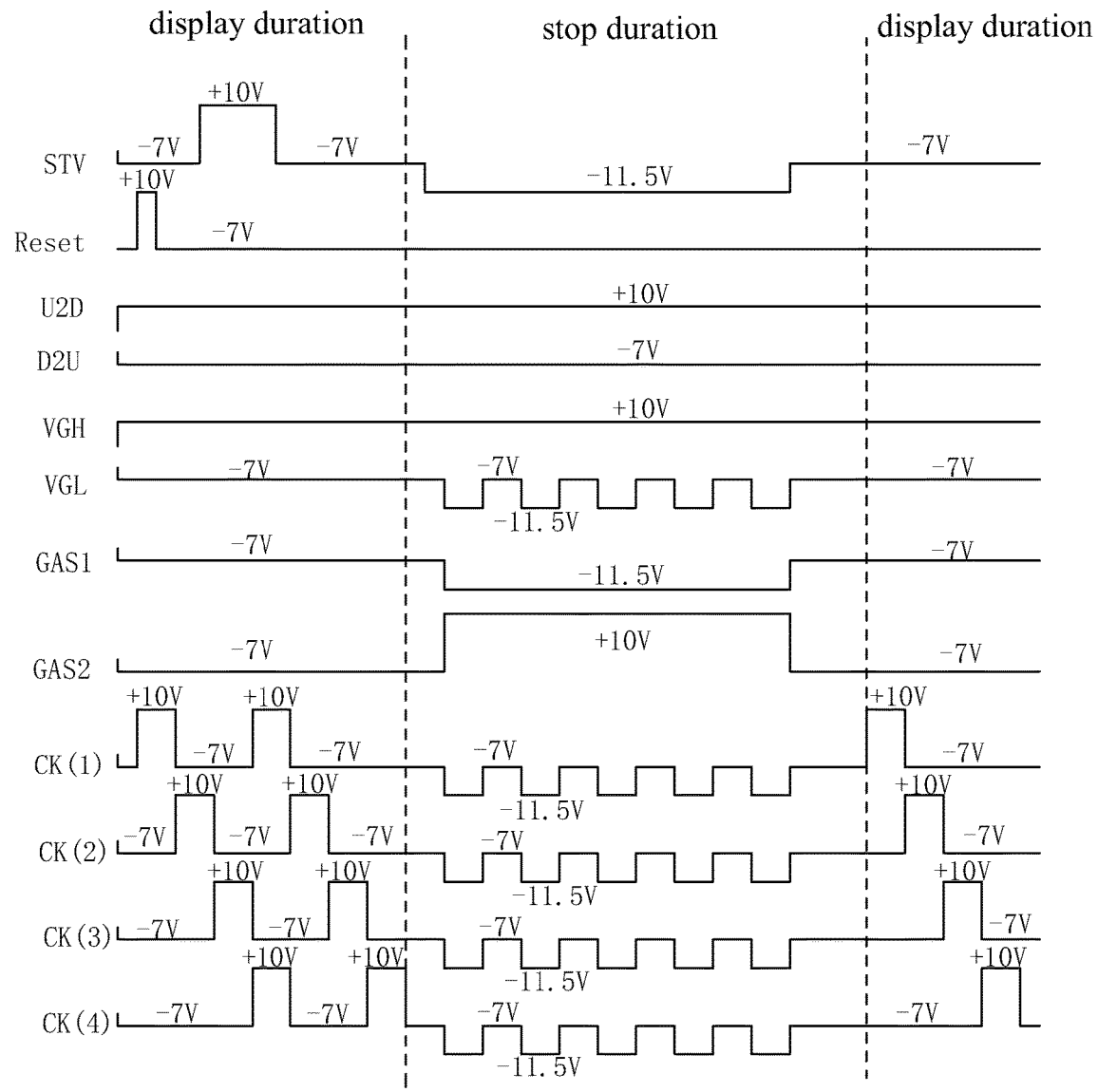
FIG. 7 is a schematic view showing the operation timing of the GOA circuit for the touch display panel during the normal display duration provided by an embodiment of the present invention.

Refer to FIG. 1, and also FIG. 6 and FIG. 7. the present invention provides a GOA circuit for in-cell type touch display panel, which comprises: a plurality of cascade GOA units, N being a positive integer, the N-th stage GOA unit further comprising: a forward and backward scan control module 1, a first node pull-down control module 2, a second node control module 3, a second node reset module 4, a stop-duration output control module 5, a black-screen-duration output control module 6, and a normal-display-duration output control module 7.

The forward and backward scan control module 1 comprises: a first N-type TFT T1, a gate of the first N-type TFT T1 being connected to the scan output end G(N−2) of the GOA unit of an (N−2)-th stage, a source connected to a forward scan signal U2D, and a drain connected to the first node Q(N); a second N-type TFT T2, a gate of the second N-type TFT T2 being connected to the scan output end G(N+2) of the GOA unit of an (N+2)-th stage, a source being connected to a backward scan signal D2U, and a drain connected to the first node Q(N). During forward scanning, the forward scan signal U2D is at a positive voltage level, and the backward scan signal is at a negative voltage level; during backward scanning, the forward scan signal U2D is at a negative voltage level, and the backward scan signal is at a positive voltage level.

The first node pull-down control module 2 further comprises: a fifth N-type TFT T5, a gate of fifth N-type TFT T5 connected to the second node P(N), a source connected to a negative voltage VGL and a drain connected to the first node Q(N); and a eleventh N-type TFT T11, a gate of the eleventh N-type TFT T11 connected to the scan output end G(N−2) of the GOA unit of the (N−2)-th stage, a source connected to the negative voltage VGL and a drain connected to the second node P(N).

The black-screen-duration output control module 6 further comprises: a thirteenth N-type TFT T13; a gate and the source of the thirteenth N-type TFT T13 both connected to a first global control signal GAS1, and a drain being connected to the scan output end G(N); the first global control signal GAS1 providing a constant positive voltage during black screen duration to make the thirteenth N-type TFT T13 of GOA unit of each stage conductive so that the scan driving signals of each stage being raised to a high level voltage to realize the all-gate-on function.

The second node control module 3 further comprises a twelfth N-type TFT T12, a gate of the twelfth N-type TFT T12 being connected to the first global control signal GAS1, a source connected to the negative voltage VGL and a drain connected to the second node P(N); during black screen duration, the twelfth N-type TFT T12 of GOA unit of each stage being controlled by the first global control signal GAS1 to become conductive, and the negative voltage VGL providing a constant negative voltage during the black screen duration to pull down the voltage of the second node P(N). The second node control module 3 further comprises: a third N-type TFT T3, a gate of the third N-type TFT T3 connected to the forward scan signal U2D, a source connected to an (m−1)-th clock signal set CK(m−1) corresponding to the GOA unit of an (N−1)-th stage; a fourth N-type TFT T4, a gate of the fourth N-type TFT T4 connected to the backward scan signal D2U, a source connected to an (m+1)-th clock signal set CK(m+1) corresponding to the GOA unit of the (N+1)-th stage, and a drain connected to the drain of the third N-type TFT T3; a sixth N-type TFT T6, a gate of the sixth N-type TFT T6 connected to the first node Q(N), a source connected to the negative voltage VGL, and a drain connected to the second node P(N); a seventh N-type TFT T7, a gate of the seventh N-type TFT T7 connected to a positive voltage VGH, a source and the drain connected to the first node Q(N); and an eighth N-type TFT T8, a gate of the eighth N-type TFT T8 connected to the drain of the third N-type TFT T3 and the drain fourth N-type TFT T4, a source connected to the positive voltage VGH, a the drain connected to the second node P(N).

The second node reset module 4 further comprises: a fourteenth N-type TFT T14; a gate and a source of the fourteenth N-type TFT T14 being connected to a reset signal Reset, a drain being connected to the second node P(N); the reset signal Reset providing a single positive voltage pulse signal to make the fourteenth N-type TFT T14 of GOA unit of each stage conductive so that the second node P(N) of GOA unit of each stage being reset to high voltage level.

The stop-duration output control module 5 further comprises a fifteenth N-type TFT T15, a gate of the fifteen N-type TFT T15 connected to a second global control signal GAS2, a source connected to the negative voltage VGL, and a drain being connected to the scan output end G(N); the second global control signal GAS2 providing a constant positive voltage during the stop duration to make the fifteenth N-type TFT T15 of GOA unit of each stage conductive; the negative voltage VGL providing a pulse signal the same as a touch signal in amplitude, phase and frequency during the stop duration so as to reduce the cross-talk between the touch signal and the scan output end G(N).

The normal-display-duration control module 7 further comprises: a ninth N-type TFT T9, a gate of the ninth N-type TFT T9 connected to the second node P(N), a source connected to the negative voltage VGL, and a drain connected to the scan output end G(N); and a tenth N-type TFT T10, a gate of the tenth N-type TFT T10 connected to the first node Q(N), a source connected to an m-th clock signal set CK(m), and a drain connected to the scan output end G(N).

The GOA circuit for in-cell type touch display panel further comprises: a first capacitor C1, the first capacitor C1 having one end connected to the negative voltage VGL and the other end connected to the second node P(N); and a second capacitor C2, the second capacitor C2 having one end connected to the gate of the tenth N-type TFT T10 and the other end connected to the drain of the tenth N-type TFT T10.

The clock signal comprises four sets of clock signals: the first clock signal set CK(1), the second clock signal set CK(2), the third clock signal set CK(3) and the fourth clock signal set CK(4); when the m-th clock signal set is the fourth clock signal set CK(4), the (m+1)-th clock signal set is the first clock signal set CK(1); when the m-th clock signal set is the first clock signal set CK(1), the (m−1)-th clock signal set is the fourth clock signal set CK(4).

Figure 2:
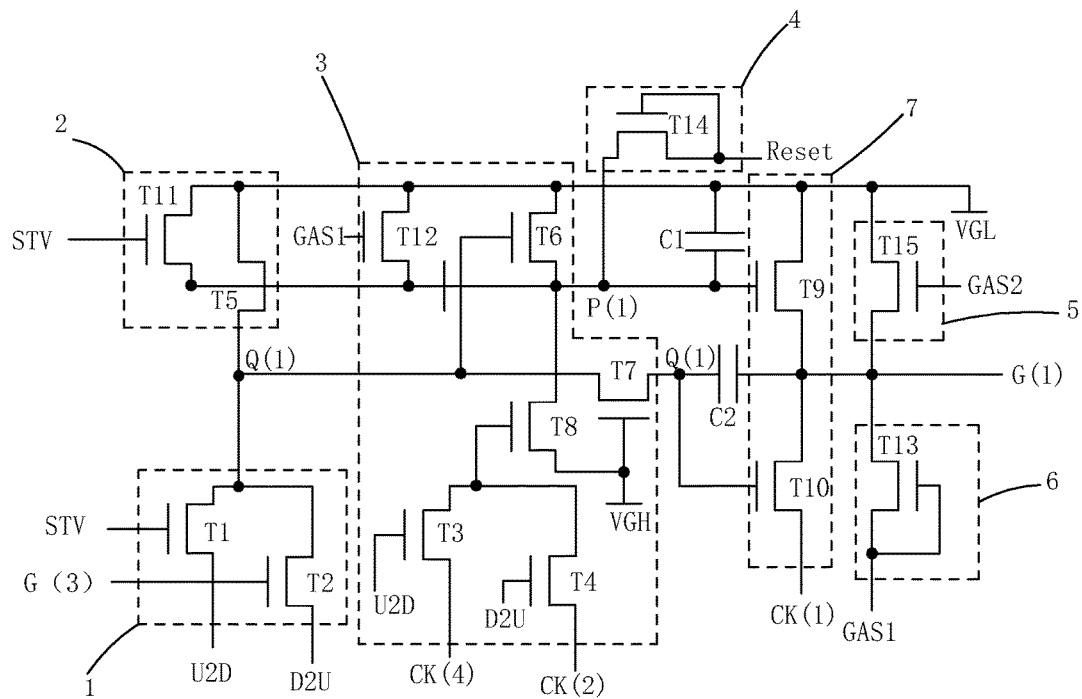
FIG. 2 is a schematic view showing the connection of the GOA circuit of the first stage for in-cell type touch display panel provided by an embodiment of the present invention.

Specifically, refer to FIG. 2. In the GOA unit of the first stage, the gates of the first N-type TFT T1 and the eleventh N-type TFT T11 are connected to a circuit activation signal STV, the gate of the second N-type TFT T2 is connected to the scan output end G(3) of the GOA unit of the third stage, the source of the third N-type TFT T3 is connected to the fourth clock signal set CK(4), the source of the fourth N-type TFT T4 is connected to the second clock signal set CK(2), and the source of the tenth N-type TFT T10 is connected to the first clock signal set CK(1).

Figure 3:
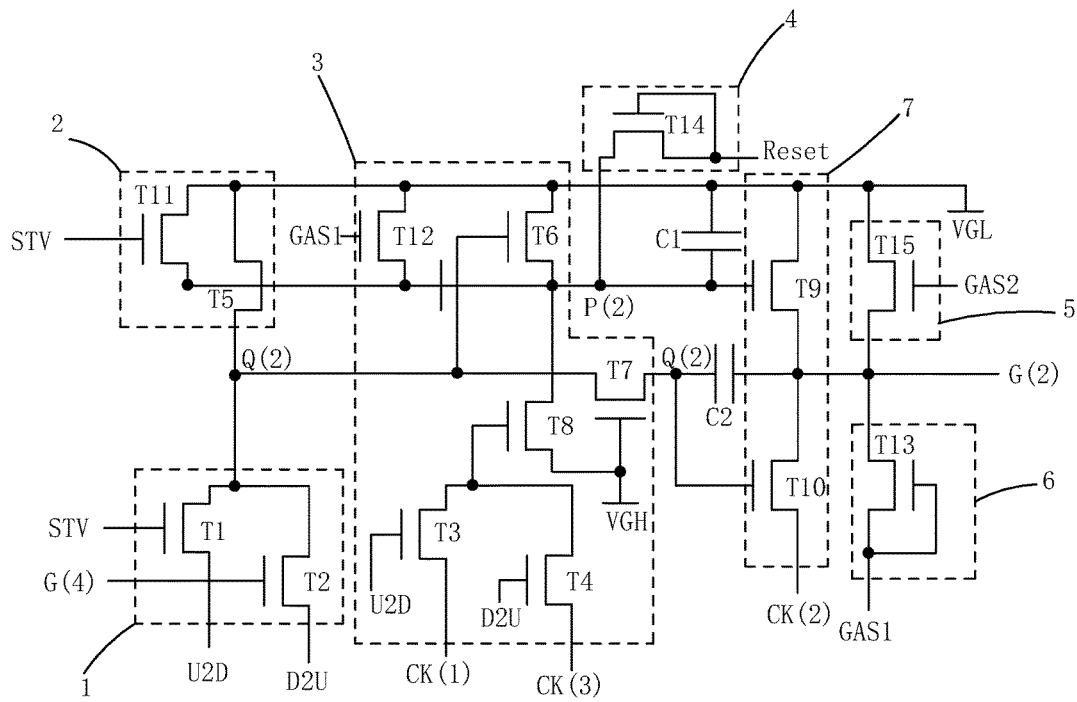
FIG. 3 is a schematic view showing the connection of the GOA circuit of the second stage for in-cell type touch display panel provided by an embodiment of the present invention.

Refer to FIG. 3. In the GOA unit of the second stage, the gates of the first N-type TFT T1 and the eleventh N-type TFT T11 are connected to a circuit activation signal STV, the gate of the second N-type TFT T2 is connected to the scan output end G(4) of the GOA unit of the fourth stage, the source of the third N-type TFT T3 is connected to the first clock signal set CK(1), the source of the fourth N-type TFT T4 is connected to the third clock signal set CK(3), and the source of the tenth N-type TFT T10 is connected to the second clock signal set CK(2).

Figure 4:
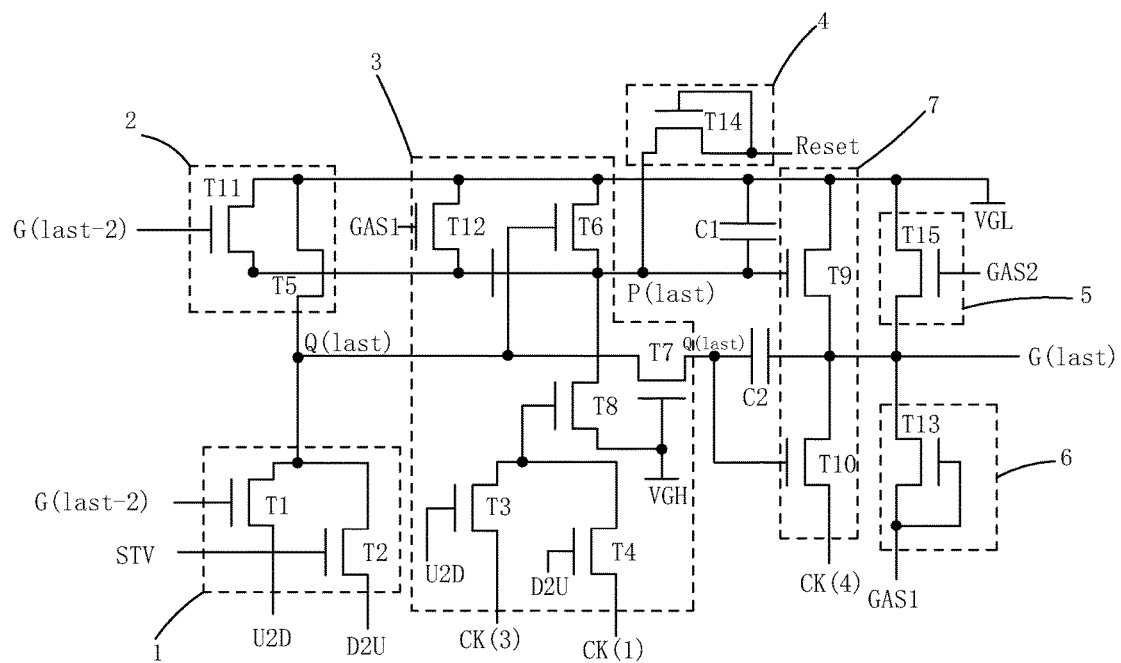
FIG. 4 is a schematic view showing the connection of the GOA circuit of the last stage for in-cell type touch display panel provided by an embodiment of the present invention.

Refer to FIG. 4. In the GOA units of the last stage, the gates of the first N-type TFT T1 and the eleventh N-type TFT T11 are connected to the scan output end G(last-2) of the GOA unit of the third last stage, the gate of the second N-type TFT T2 is connected to the circuit activation signal STV, the source of the third N-type TFT T3 is connected to the third clock signal set CK(3), the source of the fourth N-type TFT T4 is connected to the first clock signal set CK(1), and the source of the tenth N-type TFT T10 is connected to the fourth clock signal set CK(4).

Figure 5:
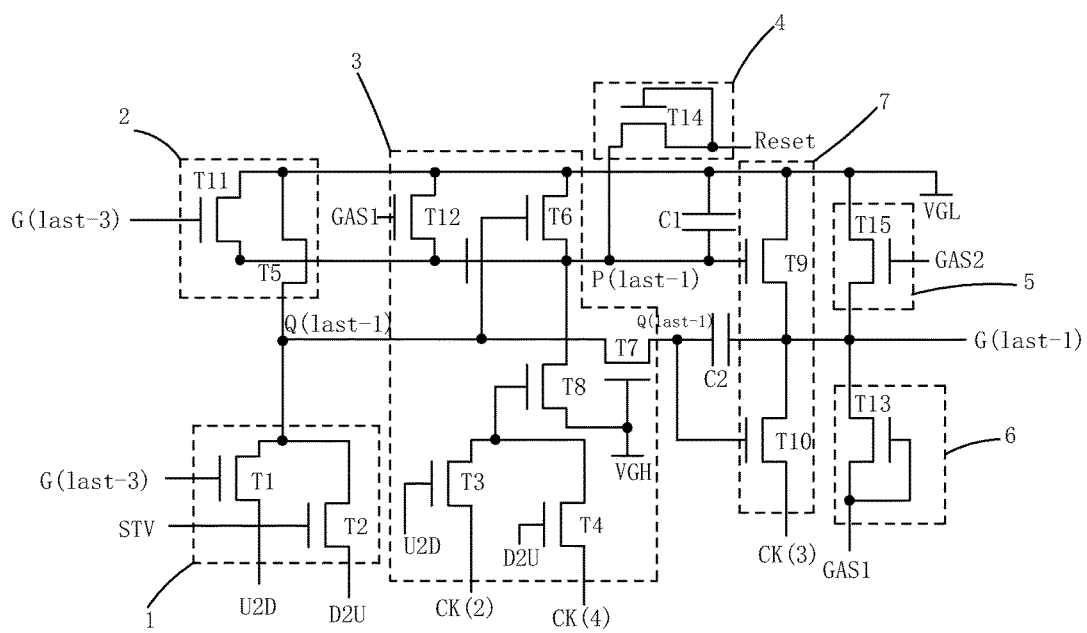
FIG. 5 is a schematic view showing the connection of the GOA circuit of the second last stage for in-cell type touch display panel provided by an embodiment of the present invention.

Refer to FIG. 5. In the GOA units of the last stage, the gates of the first N-type TFT T1 and the eleventh N-type TFT T11 are connected to the scan output end G(last-3) of the GOA unit of the fourth last stage, the gate of the second N-type TFT T2 is connected to the circuit activation signal STV, the source of the third N-type TFT T3 is connected to the second clock signal set CK(2), the source of the fourth N-type TFT T4 is connected to the fourth clock signal set CK(4), and the source of the tenth N-type TFT T10 is connected to the third clock signal set CK(3).

Moreover, when the second node P(N) is at the high level, the fifth N-type TFT T5 of the first node pull-down control module becomes conductive and pulls down the voltage of the first node Q(N) and turns off the tenth N-type TFT T10 to prevent the m-th clock signal set from outputting to the scan output end G(N).

When the third N-type TFT T3 or the fourth N-type TFT T4 of the second node control module 3 is conductive, the corresponding clock signal connected to the gate of the eighth N-type TFT T8 makes the eighth N-type TFT T8 conductive to raise the second node P(N) to the high voltage level. When the first node Q(N) is at the high voltage level, the sixth N-type TFT T6 is conductive and pulls down the voltage level of the second node P(N).

The operation of the in-cell type touch display panel is divided into the black screen duration and the normal display duration. The normal display duration further includes the stop duration to perform touch detection. Refer to FIG. 2 and FIG. 6. During the black screen duration, the scan activation signal, the positive voltage and the first global control signal are all set to 5V; the reset signal, each clock signal set, the forward and backward scan signals, the negative voltage, and the second global control signal are all set to −5V.

During the normal display duration, the scan activation signal STV provides a 5V voltage, the first global control signal GAS1 provides a 5V voltage, the thirteenth N-type TFT T13 becomes conductive and the scan driving signal of each stage becomes high to realize the all-gate-on function and clears the residual voltage of the pixels. Because the first global control signal is a 5V voltage, the twelfth N-type TFT T12 becomes conductive, and because the scan driving signal of each stage becomes high, the eleventh N-type TFT T11 becomes conductive, at this point, the negative voltage VGL is −5V to pull down the second node P(N) to −5V, the ninth N-type TFT T9 turns off to prevent the negative voltage VGL from outputting to the scan output end G(N). Under the control of scan activation signal STV and the scan driving signal of each stage, the first N-type TFT T1 and the second N-type TFT T2 are conductive to pull down the voltage level of the first node Q(N) to the −5V level of the forward scan signal U2D and the backward scan signal D2U, the tenth N-type TFT T10 turns off to prevent the m-th clock signal set CK(m) from outputting to the scan output end G(N) to cause the all-gate-on function ineffective.

In addition, during the black screen duration, the positive voltage VGH is 5V, and the reset signal Reset and each clock signal set are all −5V.

Refer to FIG. 2 and FIG. 7. When the black screen is awakened, the reset signal Reset provides a single positive voltage signal with high level at 10V and low level at −7V. The fourteenth N-type TFT T14 is conductive and the second node P(N) is raised by the reset signal Reset to the high level so that the ninth N-type TFT T9 becomes conductive to pull down the scan driving signal of each stage to the negative voltage VGL at −7V, at this point, the circuit enters the normal display duration.

In the normal display duration, the high level of the scan activation signal STV has a high level set as 10V and a low level set as −7V; the positive voltage VGH is 10V; the negative voltage VGL is −7V; the first global control signal GAS1 and the second global control signal GAS2 are both set as −7V; each clock signal set has a high level set as 10V and a low level set as −7V, and each clock signal set is delayed by a pulse width sequentially. During forward scanning duration, the forward scan signal U2D is 10V and the backward scan signal D2U is −7V; during the backward scanning duration, the forward scan signal U2D is −7V and the backward scan signal D2U is 10V.

During the stop duration of the normal display duration, the scan activation signal STV is −11.5V; the first N-type TFT T1 and the second N-type TFT T2 are turned off to prevent the voltage level of the first node Q(N) from being pulled down and maintain the first node Q(N) at high level to realize the holding of stage propagation signal. At the same time, during the stop duration, each clock signal set has the same amplitude, phase and frequency and acts as touch signals, having a high level set to −7V and a low level set to −11.5V; the negative voltage VGL is a pulse signal having the same amplitude, phase and frequency as each clock signal set, with a high level set to −7V and a low level set to −11.5V; the second global control signal is 10V, the fifteenth N-type TFT T15 is conductive to output the negative voltage VGL in the pulse form to the scan output end of each stage to reduce the cross-talk between the touch signal and the scan output end G(N).

During the stop duration, the reset signal Reset is −7V; the positive voltage VGH is 10V; and the first global control signal GAS1 is −11.5V.

In summary, the present invention provides a GOA circuit for in-cell type touch display panel; during the black screen duration, using the first global control signal to make the thirteenth N-type TFT conductive so that the scan driving signal of each stage is raised to the high level, using the first global control signal to make the twelfth N-type TFT conductive to pull down the voltage level of the second node to prevent the negative voltage from outputting to the scan driving signal and by making the first N-type TFT and the second N-type TFT conductive to pull down the voltage level of the first node to prevent the clock signal from outputting to the scan driving signal to avoid ineffective all-gate-on function; using reset signal and the fourteenth N-type TFT to reset the second node of GOA unit of each stage to realize the normal output after awaking from the black screen duration; during the stop duration, the negative voltage is set as a pulse signal having the same amplitude, phase and frequency as the touch signal, the second global control signal is used to make the fifteenth N-type TFT of GOA unit of each stage conductive and output the negative voltage in a pulse form so as to reduce the cross-talk between the touch signal and the scan output end.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A gate driver on array (GOA) circuit for in-cell type touch display panel, which comprises: a plurality of cascade GOA units, N being a positive integer, the N-th stage GOA unit further comprising: a forward and backward scan control module, a first node pull-down control module, a second node control module, a second node reset module, a stop-duration output control module, a black-screen-duration output control module, and a normal-display-duration output control module;

the black-screen-duration output control module further comprising: a thirteenth N-type thin film transistor (TFT); a gate and a source of the thirteenth N-type TFT both connected to a first global control signal, and a drain being connected to a scan output end; the first global control signal providing a constant positive voltage during black screen duration to make the thirteenth N-type TFT of GOA unit of each stage conductive so that the scan driving signals of each stage being raised to a high level voltage;

the second node control module further comprising: a twelfth N-type TFT; a gate of the twelfth N-type TFT being connected to the first global control signal, a source connected to a negative voltage and a drain connected to a second node; during black screen duration, the twelfth N-type TFT of GOA unit of each stage being controlled by the first global control signal to become conductive, and the negative voltage providing a constant negative voltage during the black screen duration to pull down the voltage level of the second node;

the second node reset module further comprising: a fourteenth N-type TFT; a gate and a source of the fourteenth N-type TFT being connected to a reset signal, a drain being connected to the second node; the reset signal providing a single positive voltage pulse signal when awakening from the black screen duration to make the fourteenth N-type TFT of GOA unit of each stage conductive so that the second node of GOA unit of each stage being reset to the high level;

the stop-duration output control module further comprising: a fifteenth N-type TFT, a gate of the fifteenth N-type TFT connected to a second global control signal, a source connected to the negative voltage, and a drain being connected to the scan output end; the second global control signal providing a constant positive voltage during the stop duration to make the fifteenth N-type TFT of GOA unit of each stage conductive; the negative voltage providing a pulse signal the same as a touch signal in amplitude, phase and frequency during the stop duration so as to reduce the cross-talk between the touch signal and the scan output end.

2. The GOA circuit for in-cell type touch display panel as claimed in claim 1, wherein the forward and backward scan control module comprises: a first N-type TFT, a gate of the first N-type TFT being connected to a scan output end of the GOA unit of an (N−2)-th stage, a source connected to a forward scan signal, and a drain connected to a first node; and a second N-type TFT, a gate of the second N-type TFT being connected to a scan output end of the GOA unit of an (N+2)-th stage, a source being connected to a backward scan signal, and a drain connected to the first node;

the first node pull-down control module further comprises: a fifth N-type TFT, a gate of a fifth N-type TFT connected to the second node, a source connected to the negative voltage and a drain connected to the first node (Q(N)); and a eleventh N-type TFT, a gate of the eleventh N-type TFT connected to the scan output end of the GOA unit of the (N−2)-th stage, a source connected to the negative voltage and a drain connected to the second node;

the second node control module further comprises: a third N-type TFT, a gate of the third N-type TFT connected to the forward scan signal, a source connected to an (m−1)-th clock signal set corresponding to the GOA unit of an (N−1)-th stage; a fourth N-type TFT, a gate of the fourth N-type TFT connected to the backward scan signal, a source connected to an (m+1)-th clock signal set corresponding to the GOA unit of the (N+1)-th stage, and a drain connected to the drain of the third N-type TFT; a sixth N-type TFT, a gate of the sixth N-type TFT connected to the first node, a source connected to the negative voltage, and a drain connected to the second node; a seventh N-type TFT, a gate of the seventh N-type TFT connected to a positive voltage, a source and a drain connected to the first node; and an eighth N-type TFT, a gate of the eighth N-type TFT connected to the drain of the third N-type TFT and the drain of the fourth N-type TFT, a source connected to the positive voltage, and a drain connected to the second node; and the normal-display-duration control module further comprises: a ninth N-type TFT, a gate of the ninth N-type TFT connected to the second node, a source connected to the negative voltage and a drain connected to the scan output end; and a tenth N-type TFT, a gate of the tenth N-type TFT connected to the first node, a source connected to an m-th clock signal set, and a drain connected to the scan output end.

3. The GOA circuit for in-cell type touch display panel as claimed in claim 2, further comprising: a first capacitor, the first capacitor having one end connected to the negative voltage and the other end connected to the second node; and a second capacitor, the second capacitor having one end connected to the gate of the tenth N-type TFT and the other end connected to the drain of the tenth N-type TFT.

4. The GOA circuit for in-cell type touch display panel as claimed in claim 2, wherein in the GOA unit of the first stage and the GOA unit of the second stage, the gates of the first N-type TFT and the eleventh N-type TFT are connected to a scan activation signal; in the GOA units of the last stage and the second last stage, the gate of the second N-type TFTs is connected to the scan activation signal.

5. The GOA circuit for in-cell type touch display panel as claimed in claim 4, wherein during the black screen duration, the scan activation signal, the positive voltage and the first global control signal are all set to 5V; the reset signal, each clock signal set, the forward and backward scan signals, the negative voltage, and the second global control signal are all set to −5V.

6. The GOA circuit for in-cell type touch display panel as claimed in claim 4, wherein during the normal display duration, the scan activation signal has a high level set as 10V and a low level set as −7V; the reset signal has a high level set as 10V and a low level set as −7V; the positive voltage is 10V; the negative voltage as −7V; the first global control signal and the second global control signal are both set as −7V; each clock signal set has a high level set as 10V and a low level set as −7V, and each clock signal set is delayed by a pulse width sequentially; during forward scanning duration, the forward scan signal is 10V and the backward scan signal is −7V; during the backward scanning duration, the forward scan signal is −7V and the backward scan signal is 10V.

7. The GOA circuit for in-cell type touch display panel as claimed in claim 4, wherein during the stop duration, the scan activation signal is −11.5V; the reset signal is −7V; the positive voltage is 10V; each clock signal set has the same amplitude, phase and frequency and acts as touch signals, having a high level set to −7V and a low level set to −11.5V; the negative voltage is a pulse signal having the same amplitude, phase and frequency as each clock signal set, with a high level set to −7V and a low level set to −11.5V; the first global control signal is −11.5V and the second global control signal is 10V.

8. The GOA circuit for in-cell type touch display panel as claimed in claim 7, wherein the clock signal comprises four sets of clock signals: a first clock signal set, a second clock signal set, a third clock signal set and a fourth clock signal set; when the m-th clock signal set is the fourth clock signal set, the (m+1)-th clock signal set is the first clock signal set; when the m-th clock signal set is the first clock signal set, the (m−1)-th clock signal set is the fourth clock signal set.

* * * * *